US012435557B2

(12) United States Patent
Eubelen et al.

(10) Patent No.: US 12,435,557 B2
(45) Date of Patent: Oct. 7, 2025

(54) AUTOMATIC DOOR

(71) Applicant: BEA SA, Angleur (BE)

(72) Inventors: Emmanuel Eubelen, Dalhem (BE); Mauro Musso, Grâce-Hollogne (BE)

(73) Assignee: BEA SA, Angleur (BE)

( * ) Notice: Subject to any disclaimer, the term of this patent is extended or adjusted under 35 U.S.C. 154(b) by 183 days.

(21) Appl. No.: 18/007,785

(22) PCT Filed: Jun. 4, 2021

(86) PCT No.: PCT/EP2021/065051
§ 371 (c)(1),
(2) Date: Dec. 5, 2023

(87) PCT Pub. No.: WO2021/245258
PCT Pub. Date: Dec. 9, 2021

(65) Prior Publication Data
US 2024/0011343 A1 Jan. 11, 2024

(30) Foreign Application Priority Data
Jun. 4, 2020 (EP) ................................. 20178362.8

(51) Int. Cl.
*E05F 15/43* (2015.01)

(52) U.S. Cl.
CPC ........ *E05F 15/43* (2015.01); *E05F 2015/434* (2015.01); *E05Y 2400/44* (2013.01); *E05Y 2400/508* (2013.01); *E05Y 2900/132* (2013.01)

(58) Field of Classification Search
CPC ................ E05F 15/43; E05F 2015/434; E05Y 2400/508; E05Y 2900/132
See application file for complete search history.

(56) References Cited

U.S. PATENT DOCUMENTS 5,845,692 A * 12/1998 Kellem .................. E05G 5/003 160/187
8,384,768 B2 * 2/2013 Link ..................... G06V 20/53 348/47

(Continued)

FOREIGN PATENT DOCUMENTS

CN 104234575 A 12/2014
CN 210134746 U 3/2020

(Continued)

OTHER PUBLICATIONS

International Search Report and Written Opinion from PCT/EP2021/065051, Aug. 19, 2021, 11 pages, Joao Luis Madeira.

(Continued)

*Primary Examiner* — Mohamed Barakat
(74) *Attorney, Agent, or Firm* — Dicke, Billig & Czaja, PLLC

(57) ABSTRACT

The invention relates to an automatic door and method for controlling an automatic door (10), comprising a door controller unit (70) for controlling a door, acting on a door drive; further comprising a monitoring system (11) comprising at least two door sensors (12, 32) mounted on two opposite sides of the door, as seen in passage direction, where each of said sensors (12, 32) comprises a scanning unit (16, 36) that monitors a sensor safety area, where a safety signal is applied to the door controller unit upon detection of an object within the sensor safety areas of said sensors. According to the invention after a predefined timespan (TL) of no detection within said sensor safety areas of said sensors, the monitoring system (11) is set to a "restricted mode" in which at least one sensor safety area is set to a restricted area, where the safety signal is then provided upon detection of an object within the restricted area, where further, once a (Continued)

Figure 1A:
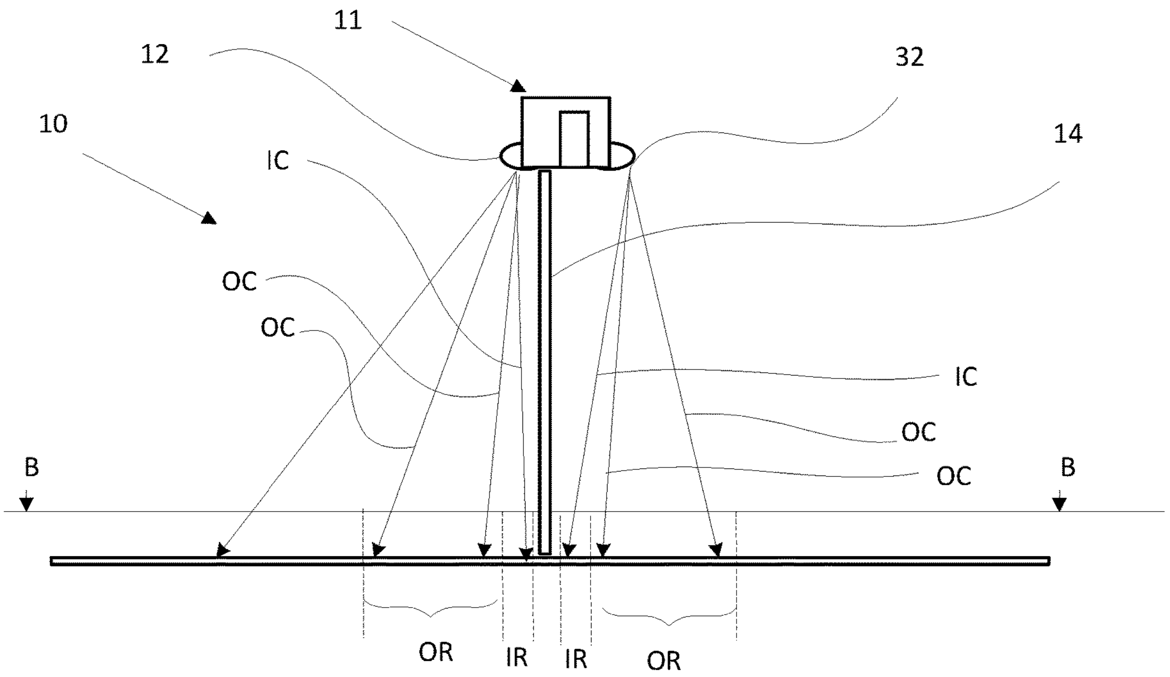

detection in the restricted area occurs, the monitoring system is set back to an unrestricted "normal" mode.

15 Claims, 5 Drawing Sheets

(56) References Cited

U.S. PATENT DOCUMENTS

| | | | | |
|---|---|---|---|---|
| 9,341,013 | B2 | 5/2016 | Iwata et al. | |
| 11,261,650 | B2* | 3/2022 | Sasaki | G01V 8/20 |
| 12,038,508 | B2 | 7/2024 | Radermecker | |
| 2002/0154012 | A1* | 10/2002 | Risi | E05F 15/632 340/541 |
| 2002/0157314 | A1* | 10/2002 | Takada | E05F 15/74 49/28 |
| 2004/0160318 | A1 | 8/2004 | Sasaki et al. | |
| 2011/0271602 | A1* | 11/2011 | Bartole | G01S 17/42 49/506 |
| 2015/0059248 | A1* | 3/2015 | Iwata | G01S 17/04 49/506 |
| 2017/0292314 | A1* | 10/2017 | Scheffer | E05F 15/00 |
| 2020/0024898 | A1* | 1/2020 | Eichstetter | E06B 9/68 |
| 2021/0026036 | A1* | 1/2021 | Thun-Hohenstein | G01S 17/32 |
| 2021/0065489 | A1* | 3/2021 | Hass | G06F 3/167 |

FOREIGN PATENT DOCUMENTS

| | | | |
|---|---|---|---|
| EP | 2843173 | A1 | 3/2015 |
| EP | 3489446 | A1 | 5/2019 |
| JP | 2006083529 | A | 3/2006 |
| JP | 2006144244 | A | 6/2006 |
| JP | 2009203749 | A | 9/2009 |
| JP | 2013227827 | A | 11/2013 |
| KR | 20190133769 | A | 12/2019 |

OTHER PUBLICATIONS

European Search Report from EP20178362.8, Nov. 25, 2020, 5 pages, Katleen Blancquaert.

Notice of Allowance for KR1020237000179; May 19, 2025; 5 pages; Examiner Jungil Seo; machine translation.

Office Action for CN202180040224.3; Apr. 30, 2025; 15 pages; Examiner Li Xiuli; machine translation.

* cited by examiner

AUTOMATIC DOOR

The invention relates to an automatic door according to the preamble of claim 1 as well as to a method for controlling an automatic door with two sensors according to the preamble of claim 12.

It is commonly known that automatic doors, especially industrial doors, are monitored by sensors to detect objects in the vicinity of the door. It is also an object of these sensors to avoid people or machines getting crushed by the door when the door closes and people or machines are still below or beside the door. Accordingly, a safety area is defined, preferably on both sides of the door, and when an object is detected within this safety area, during safety monitoring, a safety procedure is triggered on the door controller to protect the people or machines from being hit by the door. Usually, this situation occurs during closing of the door. The safety procedure leads to a stop or a reversion of the closing movement of the door. The movement direction of the door can preferably be vertically or horizontally.

Since the safety area is very close to the door, it happens that due to a distortion of the door a "safety-situation" is falsely triggered. Falsely, as there is a detection of an object although no object is present in the vicinity of the door, as the sensor is disturbed by the door itself. This disturbance may occur due to wind that deforms the door or may be caused by present dents in the door that have been created by accidents, e.g., by forklifts.

The problem is that the sensors cannot distinguish whether the detection was caused by a real intrusion or by the door itself.

The object of the invention refers to avoiding a false detection of objects by controlling automatic doors, especially of industrial doors, and still keeping a high safety level.

The object is solved by the characterizing features of claim 1 in combination with the features of its preamble.

The dependent claims state further advantageous improvements of the invention.

An automatic door, in a known way, comprises a door controller unit for controlling a door, where the door controller is acting on the door drive. The automatic door further comprises a monitoring system comprising at least two door sensors mounted on two opposite sides of the door, as seen in passage direction.

The door controller unit is connected to the monitoring system. Each of the at least two door sensors comprises a scanning unit that monitors a sensor safety area having at least two regions, one inner region and one outer region, where the outer region is further away from the door than the inner region. The said two sensor safety areas, sum up to a door safety area.

Each of these sensors comprises a detection unit to identify the presence of an object within the inner region and/or the outer region. The inner region is analysed by the detection unit and a first detection information is generated. The outer region is analysed by the detection unit and a second detection information is generated. The detection information is used to determine whether or not an object is detected within the specific region. The detection unit can preferably be a determination unit of a scanning unit being a TOF-Laser scanner, where the determination unit evaluates the time of flight of an echo of a generated laser pulse and determines the position of an object thereto. The inner and outer region can preferably be scanned by such a Laser scanner, where a plurality of echo spots is assigned to the inner and the outer region. The Laser scanner can be embodied to provide subsequent measurements to monitor the inner and outer region or provide a parallel measurement where, e.g. pixels of a TOF camera are assigned to the inner and outer region.

The monitoring system furthermore comprises an evaluation unit that receives the information of the detection units. The evaluation unit is embodied to determine that no detection occurred in either region of the door safety area, based on the first detection information and second detection information of both sensors. The first detection information and the second detection information can be communicated in a way that the received information is a result information where the first and the second detection information are combined by a logic OR. In this case it might no longer be determinable for the evaluation unit in which specific region of the sensor safety area the detection occurred. Alternatively, the first and the second detection information can be communicated in a way that the information is distinguishable.

According to the invention, the evaluation unit determines a timespan of "no-detection" within which no detection occurred in either region of both sensors. The evaluation unit is embodied to employ a "restricted mode" when a predefined time-limit lapses.

During the "restricted mode" the area of detection in the first region is restricted to a restricted area, where detection information is only forwarded to the door controller unit based on the detection within the restricted area. This means that an area of the first region that is an area of detection in a "normal mode" is faded out in "restricted mode". During the "restricted mode" a safety signal is provided to the safety port of the door controller unit, where the safety signal is dependent at least on the second detection information and, if present, on a first detection information as well. The second detection information refers to the outer region that can stay the same during "restricted mode" and "normal" mode. As the outer region is further away from the door than the inner region, this setup takes care that a person cannot arrive at the inner region without crossing the outer region.

The timespan where the monitoring system is in "restricted mode" starts, when the timespan of "no-detection" exceeds a predefined time-limit and can last up to a moment, where any of the detection units provides a positive second detection information or a positive first detection information of the restricted area. At that moment, the monitoring system is set back to "normal mode" of the safety monitoring. There can also be other additional events that may request the monitoring system to be set back to "normal mode".

According to this setup, a presence of an object within the faded-out area of the inner region will prevent cases of false triggering of the safety procedure of the door controller, where the setup will still provide a high level of safety.

The restricted mode of the monitoring system is preferably set, by putting the detection units into a detection state in which the detection units ignore the first detection information outside the restricted area. Accordingly, the detection signal forwarded to the evaluation unit then is only based on the second detection information or based on the second detection information and the first detection information derived from the restricted area.

The restricted area can be defined to be a part of the inner region or can also be defined to be zero.

According to a first embodiment, each sensor comprises an evaluation unit. Each evaluation unit of a sensor is connected to the detection unit of the same sensor and to the detection unit of the other sensor. According to this situation each sensor knows about the detection status of the other sensor and can provide the first and second detection information accordingly.

According to an improvement of the invention, the transmission of the first detection information in "normal mode" and "restricted mode" and the second detection information between the sensors is done by a communication port that transfers the first and the second detection information in a coded way, especially serially coded with (Pulse Width Modulation) PWM. Therefore, the communication port can comprise a contact relay that is switched on and off to code the detection information.

The sensors can comprise an input port that is connected to the communication port of the other sensor.

Alternatively, the communication can be established via a fieldbus port, especially a CAN-port, where a single interface is sufficient for input and output and, therefore, the input port and the output port can be implemented as a single physical port.

Each sensor can comprise a specific safety output port that is connected to the safety port of the door controller unit for transferring the safety signal to the door controller in parallel.

According to a further embodiment of the invention the two sensors are a first and a second sensor that both comprise a safety output port where only the safety output port of the second sensor is connected to the corresponding safety port on the door controller acting on the door controller unit. In this case the first sensor provides the first detection information and the second detection information via its communication port to the second sensor and the second sensor forwards a safety to the door controller unit, preferably combining the detection information of both sensors by an "OR"-combination. According to this setup, two sensors can work with a door controller providing one safety input only.

The wiring between the sensors and the door controller can be done via a connecting board.

The distance between the innermost borders of the inner regions of both sensors is preferably smaller than the smallest extension of a predefined test body of a size given by safety standards. This allows the automatic door, to comply with these safety standards.

The scanning unit can be embodied to generate curtains via a sequence of time of flight measurements of reflected light beams, where the interpolated beams along the sweeping direction are seen as curtain.

According to a further aspect of the invention, the evaluation unit can be embodied as a computational device comprising an input port for the at least one detection unit and at least one output port to provide at least one safety detection information to the door controller. In case, the whole inner region is faded out and the restricted area of the inner region is reduced to zero, the safety signal will be provided by the result of the second detection information only.

According to this setup, a computational device can gather the standard information of the first detection information and the second detection information and determine the timespan of no detection and when the monitoring system is set to "restricted mode", only the second detection information is forwarded to the door controller unit that may initiate the safety procedure. The "normal mode" is resumed once a detection signal is received via the second detection information.

The computational device can be an additional processing unit within the sensor.

Furthermore, the computational device can be a separate device connected between door controller and both sensors or can be part of the door controller providing the information accordingly to the door control unit of the door controller. The computational device will then receive the first detection information and the second detection information of both sensors.

According to a further aspect, the invention refers to a method for controlling an automatic door, comprising a door controller unit for controlling a door, acting on a door drive, further comprising a monitoring system. The monitoring system furthermore comprises at least two door sensors, a first and a second sensor, that are mounted on two opposite sides of the door, as seen in passage direction. Each of said sensors monitors a sensor safety area, where a safety signal is applied to the door controller unit upon detection of an object within the sensor safety areas of said sensors. After a predefined timespan of no detection within said sensor safety areas of said sensors, the monitoring system is set to a "restricted mode" in which at least one sensor safety area is set to a restricted area, where the safety signal is then provided upon detection of an object within the restricted area, where further, once a detection in the restricted area occurs, the monitoring system is set back to an unrestricted "normal" mode.

According to this method the area close to the door can be faded out under this condition and detections in the faded-out area during restricted mode do not falsely trigger the safety procedure.

The method can be implemented in an automatic door as previously described.

In a further advantageous embodiment of the method, each sensor safety area, comprises an inner region and an outer region, where the inner region is closer to the door than the outer region, where during restricted mode only the inner region is reduced to a restricted area. This ensures that the outer region ensures that the inner region cannot be reached from outside without being detected.

According to a further embodiment, each sensor comprises a detection unit that analyses the data gathered by a scanning unit, where the detection unit ignores the data outside the restricted area of the sensor safety area for generating the detection signal during the restricted mode.

According to a further aspect, the two sensors namely a first sensor and a second sensor, communicate a detection status of the sensor safety area and the restricted area to the other sensor, where each sensor is set to a restricted mode considering the information of the other sensor where only the second sensor forwards the safety signal to the door controller unit.

Further advantages, features and potential applications of the present invention may be gathered from the description which follows, in conjunction with the embodiments illustrated in the drawings.

Figure 1B:
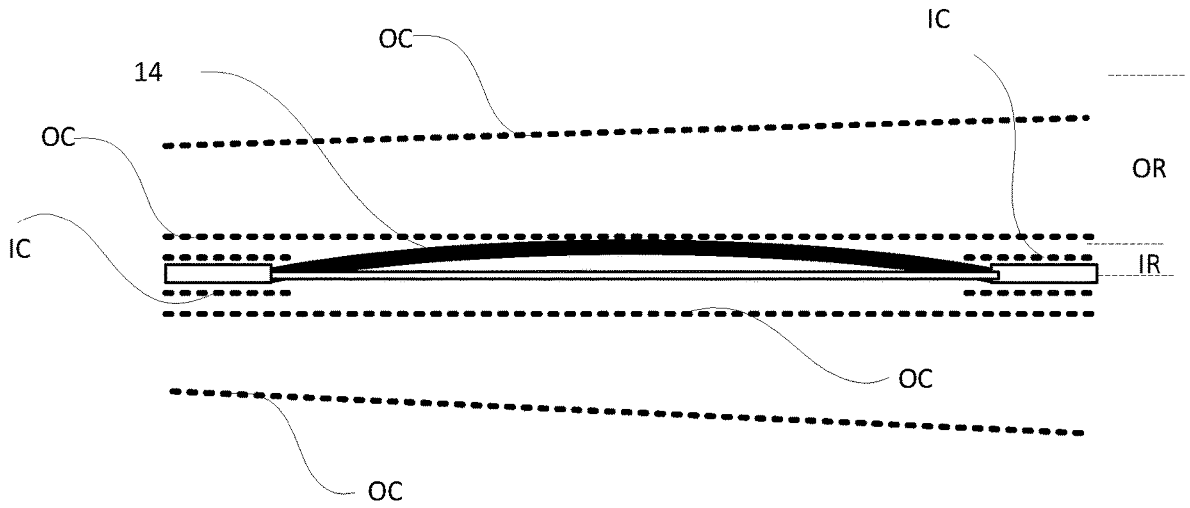
Figure 2:
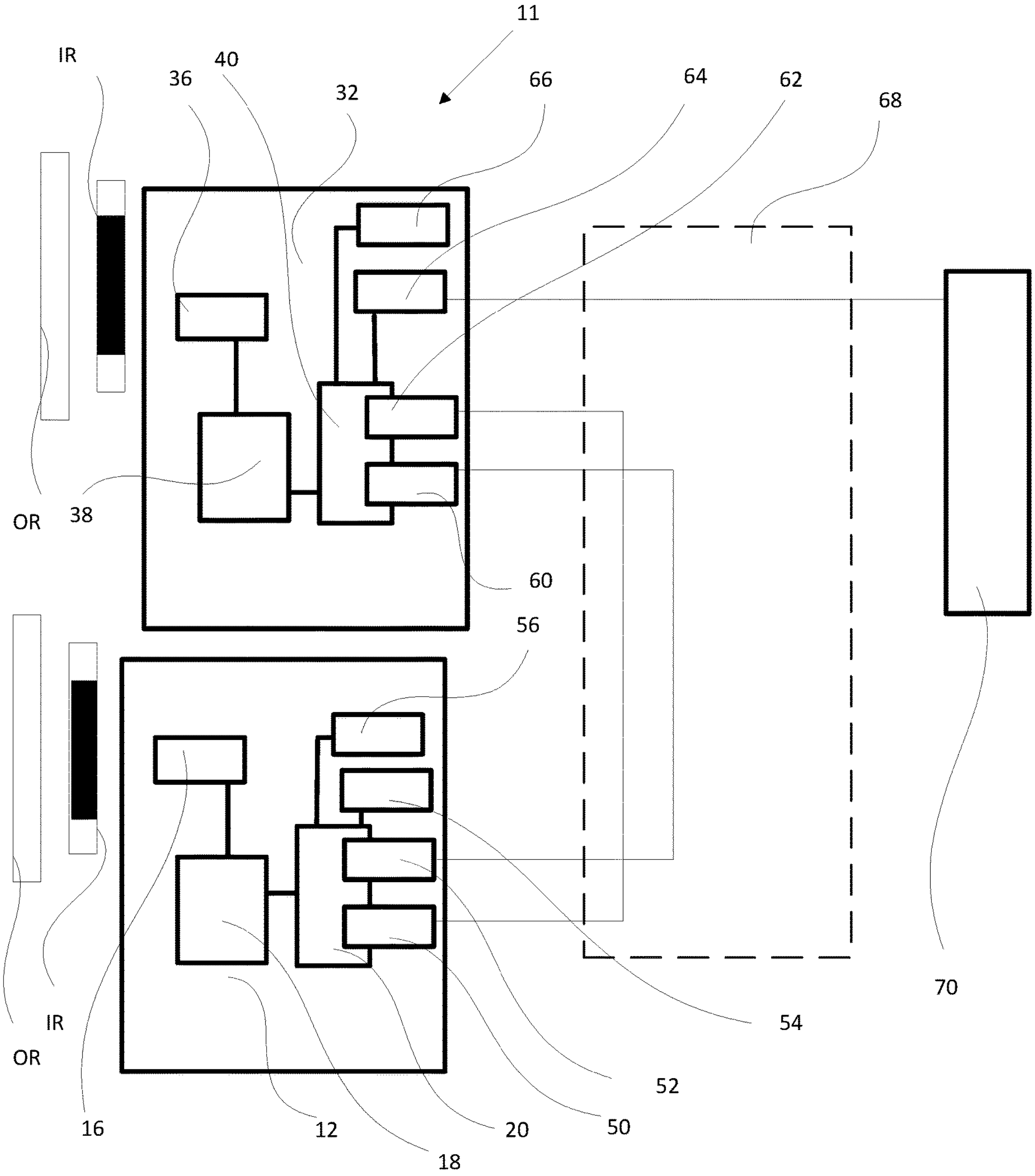
Figure 3:
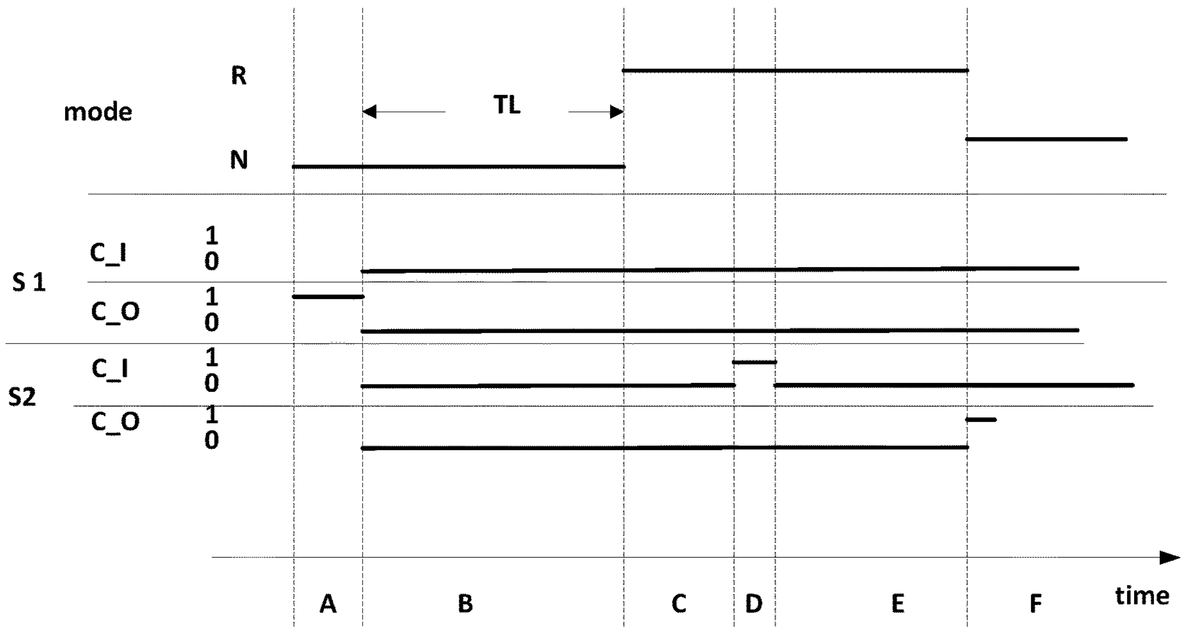
Figure 4:
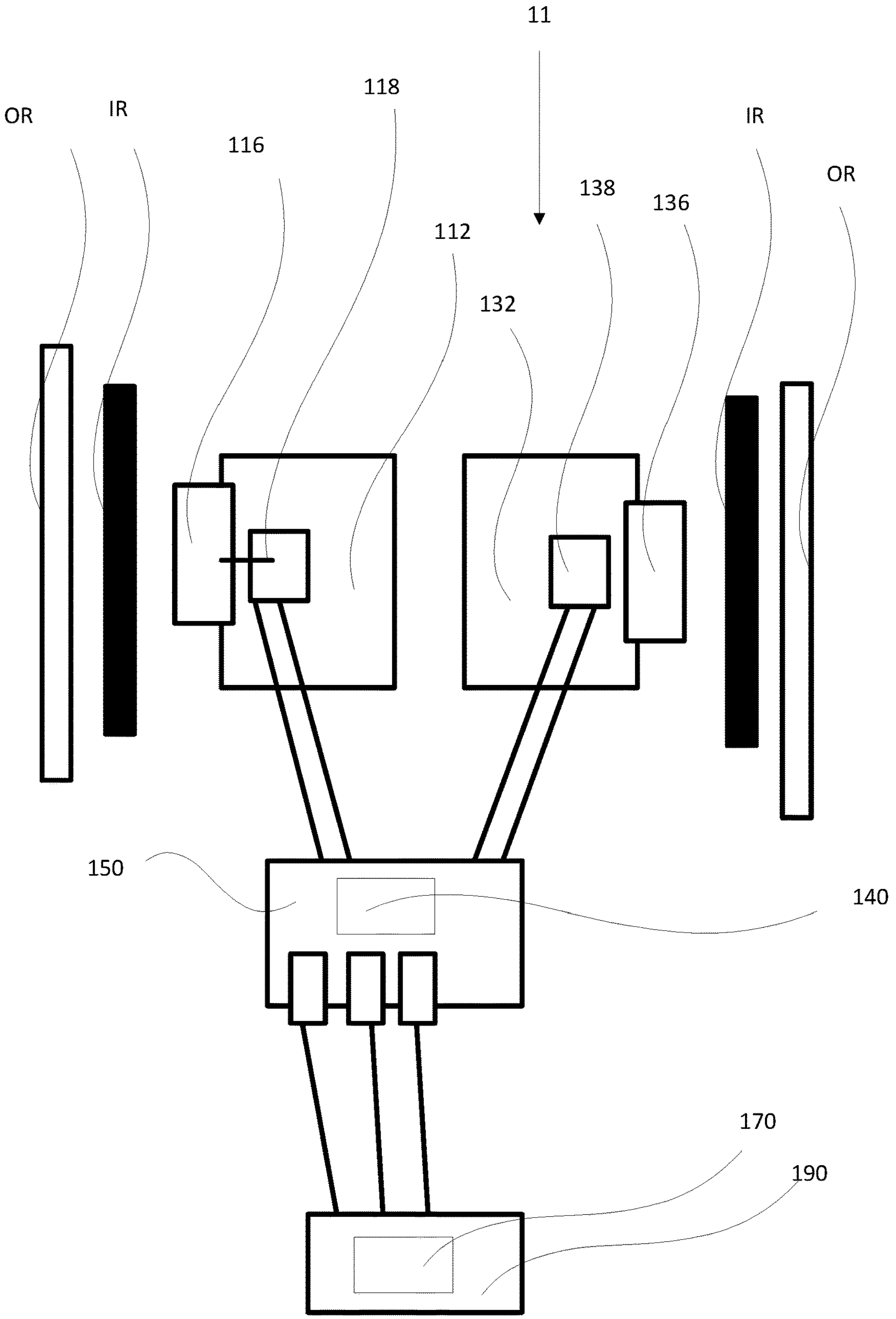

Throughout the description, the claims and the drawings, those terms and associated reference signs will be used as are notable from the enclosed list of reference signs. In the drawings is shown FIG. 1*a* a schematic side view of an automatic door;

FIG. 1*b* a schematic sectional view B-B of the automatic door;

FIG. 2 a functional view of a first setup of the monitoring system;

FIG. 3 a diagram showing the modes of the monitoring system under certain detection conditions;

FIG. 4 a functional view of a further setup of the monitoring system; and

Figure 5:
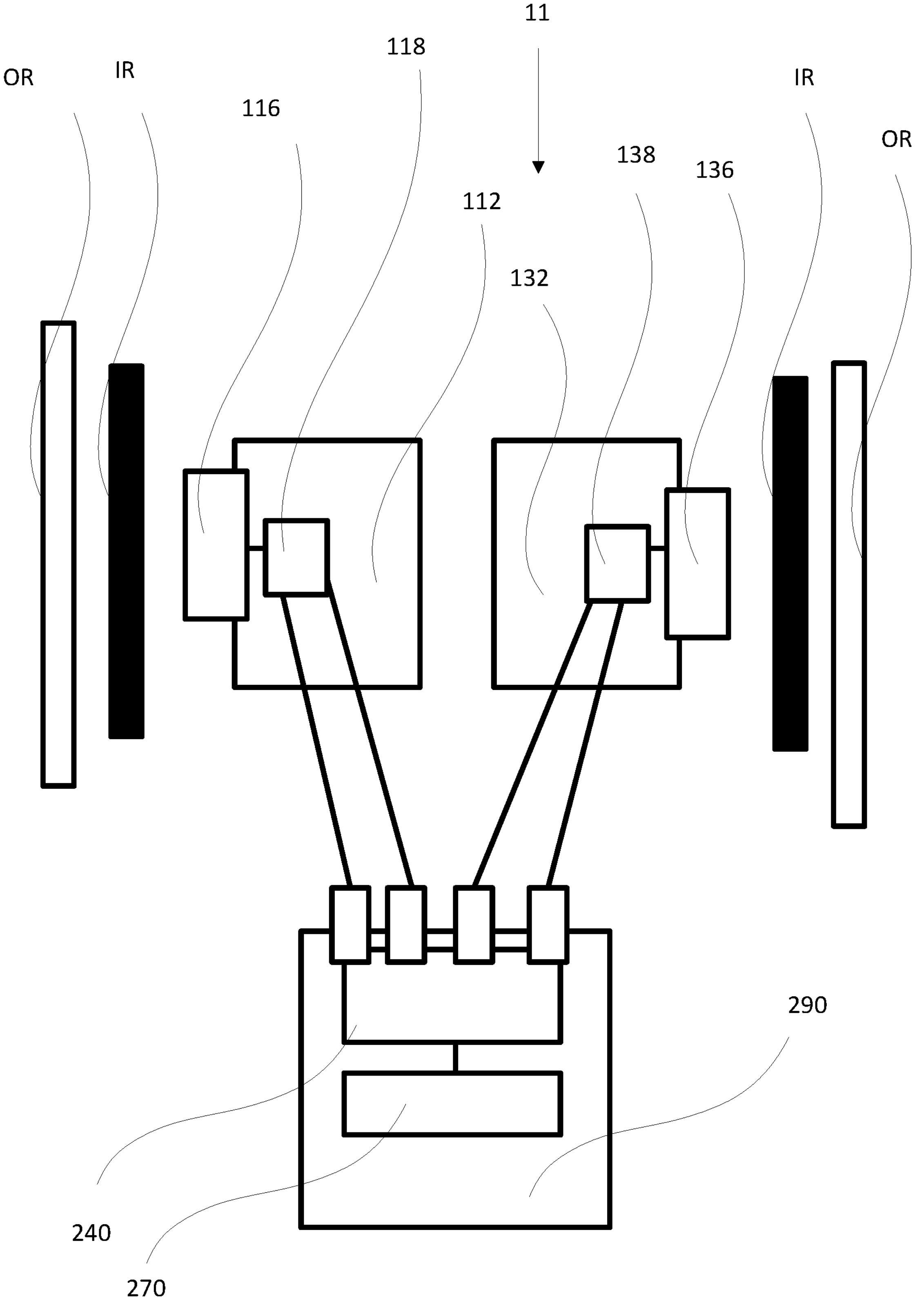

FIG. 5 a functional view of a further setup of the monitoring system.

FIG. 1*a* shows a schematic side view of an automatic door 10 according to the invention. The automatic door comprises a door element 14 driven by a door drive and a monitoring system 11 comprising two sensors 12, 32, where each of the sensors monitors at least one inner region IR and one outer region OR. The two sensors 12, 32 are mounted on opposite sides of the door viewed in passage direction. Each of the sensors comprises a scanner 16, 36 that generates two outer curtains OC and one inner curtain IC. The inner curtains IC of the sensors 12, 32, have a distance to the innermost outer curtains OC of less than the smallest extension of the test body T that is especially about 10 cm. This setup guarantees that the unmonitored region below or beside the door is smaller than the required test body size, required by safety standards.

FIG. 1*b* shows a schematic sectional view B-B of the automatic door 10 according to the invention. The door element 14 is bent by wind in the shown situation. In this situation it is shown that, according to the invention, the inner region is set to “restricted area” by fading out the central part of the first curtain. The according process and setup is explained in more detail in FIG. 2.

FIG. 2 shows a functional view of the basic setup of the monitoring system 11 according to the invention. The setup shows two sensors 12, 32. Each sensor 12, 32, comprises a scanner 16, 36 that is connected to a detection unit 18, 38 to determine in which region IR, OR of the scanner 16, 36 an object is detected. The detection unit 18, 38 is linked to an evaluation unit 20, 40 of the sensor 12, 32.

Each sensor 12, 32, furthermore, comprises an input port 50, 60, a communication output port 52, 62, a safety output port 54, 64 and a further output port 56, 66 that may be used for presence detection of curtains not used for safety purposes the output ports are not connected in this basic setup. The first detection information on the inner region and the second detection information on the outer region are related to the safety signal.

The evaluation unit 20 of the first sensor 12 is connected to the input port 50 of the first sensor 12.

The input port 50 of the first sensor 12 is connected to the communication port 62 of the second sensor 32. The evaluation unit 40 of the second sensor 32 is connected to the communication port 62 of the second sensor 32. The evaluation unit 40 applies a signal to the communication port 62 containing the first detection information and the second detection information of the detection unit 38. In that way, the evaluation unit 20 of the first sensor 12 is provided with the information of the first detection information and the second detection information of the second sensor 32. The transmission via the communication port is preferably done by Pulse Width Modulation (PWM). The signal can be a combined information of the first detection information and the second detection information.

The evaluation unit 40 of the second sensor 32 is connected to the input port 60 of the sensor 32. The input port 60 of the second sensor 32 is connected to the communication port 52 of the first sensor 12. The evaluation unit 20 of the first sensor 12 is connected to the communication port 52 of the first sensor 12. The evaluation unit 20 applies a signal to the communication port 52 containing the first information and the second information of the detection unit 18. In that way, the evaluation unit 40 of the second sensor 32 is provided with the information of the first information and second information of the first sensor 12.

As both evaluation units 20, 40 receive the information of the first information and the second information of the first sensor and the second sensor, each evaluation unit 20, 40 can independently determine the timespan of continuous “no detection” in all relevant regions IR, OR of both sensors 12, 32.

As soon as the timespan of “no detection” exceeds a predefined time limit, the sensor 12, 32 is set to “restricted mode” according to which a part of the inner region, especially the central part of the first curtain, is faded out. Accordingly, the safety signal is then generated based on a detection in the remaining restricted detection area of the inner region and no longer based on the whole inner region. The safety signal can then be transferred to the control unit 70. The safety signal still considers the detection in the outer region.

As the evaluation unit of e.g., the second sensor knows about the detection status of the safety area of both sensors 12, 32, a signal can be forwarded to the door control unit 70 by the second sensor 32 via its safety port by combining the detection information of the inner region IR the outer region OR of both sensors. According to this setup the wiring effort can be reduced.

This means that as long as the sensor 12, 32 is in this “restricted” mode, no falsely positive information is acquired in the faded-out area in a way that it would trigger a safety procedure in the door controller unit 70. In such a case, no safety signal is submitted to the door controller unit 70. The evaluation unit 20, 40 is, furthermore, embodied in a way that the monitoring system is reset to “normal” mode, when a positive detection is determined by the detection unit 18, 38 in the restricted detection area of the inner region IR or in the outer region OR. In “normal” mode, a safety signal is submitted upon a detection within the door safety area.

This leads to the effect that as long as the sensor 12, 32 is in the “restricted mode”, signals that are generated as a consequence of the deformation of the door element are ignored that way and taken into account again when the monitored safety area is e.g. interrupted from the outer region OR.

The predefined time limit, when the sensor activates the “restricted mode”, is preferably set to about 2 seconds.

The wiring between the two sensors, as described above, and the door controller is preferably done via a wiring board 68.

FIG. 3 shows the behavior of the monitoring system regarding its operational modes. The upper part of the diagram shows the mode of the monitoring system. The modes are “N” for “normal mode” and “R” for “restricted” mode. In the example of FIG. 3 the “restricted mode” is defined in a way that the faded-out area is set to the whole inner curtain and therefore covers the whole inner region, and no restricted monitoring area remains in the inner curtain IC and the inner region respectively. Alternatively, a detection information coming from the restricted area of the inner region could be regarded as an outer region signal (C_O) of the door safety area.

“S1” and “S2” are the sensors mounted opposite on the automatic door. “C_I” and “C_O” are the signals corresponding to a detection status of the scanners. During the period A there is an object detected by the scanners that is evaluated by the detection unit accordingly in one of the outer curtain OC of sensor “S1”. The monitoring system is in the “normal” detection mode. By the start of period B the object is no longer present in this outer curtain where then the detection status C_O of S1 is set to no detection. As no other detection occurs, the timespan of “no detection” starts, where the end of the timespan is set to a predefined length of TL. After expiration of TL in the period C the monitoring system is set to "restricted mode".

In period D the scanning unit recognizes a detection event in the inner curtain where the detection status C_I changes accordingly. Since the monitoring system is the "restricted mode", this event is ignored by the detection unit and not transferred to the evaluation unit.

Subsequent to this event, neither the mode of the monitoring system is changed nor is the signal forwarded to the safety port of the door controller. Hence, the door controller unit does not trigger a safety procedure, e.g., to reopen the door.

The monitoring system remains in this "restricted mode" during the period D and E. In the period F, the scanning unit of the sensor S2 detects an object in its outer curtain OC and the detection status C_O is set to "1". Although the monitoring system is in "restricted mode", the detection unit forwards the second detection information to the evaluation unit. The monitoring system is set back to "normal" mode. The second detection information is also forwarded to the door controller unit.

FIG. 4 shows a further example of the invention in case there is an inner region IR dedicated to the first detection information close to the door and the whole inner region is faded out during "restricted mode". In this example of the invention, the evaluation unit 140 is implemented within a separate computational device 150, comprising the evaluation unit 140 and having connecting ports that are connected to the detection unit 118 and the detection unit 138. whereas a consequence, the evaluation unit receives the signals containing the first detection information and the second detection information of the first sensor 112 and the second sensor 132.

In this case, the door safety area in the "restricted" mode covers the outer region only that is dedicated to the second detection information.

Accordingly, the evaluation unit 140 can prevent forwarding the first detection information to the door controller unit 170 that is part of the door controller 190 during the "restricted" mode. A detection of an object in the inner region IR during the restricted mode, therefore, does not lead to a false triggering of the safety procedure.

The evaluation unit 140 works the same way as described regarding figures FIG. 2 and FIG. 3.

FIG. 5 shows a further embodiment of the invention. The monitoring system comprises two sensors 112,132 having a scanner 116, 136 and a detection unit 118, 138, where the detection unit analyses the signals of the scanner 116, 136 and transfers a first detection information to the evaluation unit 240 that is in this case a part of the door controller 290.

After a predefined timespan of preferably 2 seconds, when the evaluation unit does not receive a detection signal of any first or second detection information, the monitoring system is set to "restricted mode".

In this case the door safety area is implemented as in the example of FIG. 4.

In this case the door controller unit 270 of the door controller 290 is supplied with the second detection information only.

Once an object is detected in the outer region OR, the monitoring system is set back to "normal" mode again considering the first and the second detection information.

LIST OF REFERENCE SIGNS

10 automatic door
11 monitoring system
12 sensor
14 door element
16 scanner
18 detection unit
20 evaluation unit
32 sensor
36 scanner
38 detection unit
40 evaluation unit
50 input port
52 communication port
54 safety information output port
56 additional information output port
60 input port
62 communication port
64 safety information output port
66 additional information output port
68 wiring board
70 door controller unit
112 sensor
116 scanner
118 detection unit
132 sensor
136 scanner
138 detection unit
140 evaluation unit
150 computational device
170 door controller unit
240 evaluation unit
270 door controller unit
290 door controller
A period
B period
C period
C_I detection status
C_O detection status
D period
E period
F period
IC inner curtain
IR inner Region
OC outer curtain
OR outer region
S1 sensor
S2 sensor

The invention claimed is:

1. An automatic door comprising a door controller unit for controlling the door and acting on a door drive, and further comprising a monitoring system comprising at least two door sensors mounted on opposite sides of the door in a passage direction, each of said sensors comprising a scanning unit that monitors a sensor safety area comprising one inner region and one outer region, and a detection unit connected to the scanning unit wherein the inner region is analysed and a first detection information is generated, and wherein the outer region is analysed and a second detection information is generated, and wherein the monitoring system comprises at least one evaluation unit connected to the detection unit and the door controller unit and upon the evaluation unit determining, based on the first detection information and the second detection information of the at least two sensors, and subsequent to a lapse of a predefined timespan wherein no object detection occurs within any sensor safety area, the monitoring system is set to a "restricted mode" in which the first detection information is taken into account only from a restricted area of the inner region and wherein the door controller unit is supplied with a safety signal based on the second detection information or the first detection information of the restricted area of the inner region and the second detection information, and wherein further, once an object detection in the outer region or the restricted area of the inner region occurs, the monitoring system is set back to unrestricted “normal” mode.

2. The automatic door according to claim 1 wherein the restricted area is a part of the inner region or none of the inner region.

3. The automatic door according to claim 1 wherein each sensor comprises a communication output port and wherein the detection unit is connected to the communication output port to transfer combined information on the first detection information and the second detection information.

4. The automatic door according to claim 3 wherein each of said sensors comprises an evaluation unit that is connected to the communication output port of the other sensor and to the detection unit of the same sensor.

5. The automatic door according to claim 4 wherein each of said sensors comprises a communication input port connected to the communication output port of the other said sensor.

6. The automatic door according to claim 5 wherein the communication input ports and the communication output ports are serial ports providing information on curtain presence detection and motion detection in a serially coded way.

7. The automatic door according to claim 1 wherein the monitoring system comprises a computational device and wherein the computational device comprises the evaluation unit, the first detection information and the second detection information are fed to the evaluation unit where during “restricted mode” only a safety signal, depending on the second detection information and the first detection information on the “restricted area,” is forwarded to the door controller unit.

8. The automatic door according to claim 1 wherein the scanning unit comprises a laser scanner, working by a time of flight echo-pulse measurement, sampling the inner region and the outer region of the sensor safety area.

9. The automatic door according to claim 8 wherein the scanning unit generates subsequent measurements along a sweeping curve so that one inner curtain and a plurality of outer curtains is formed.

10. The automatic door according to claim 1 wherein the predefined timespan of “no-detection” is set to 1 to 3 seconds.

11. The automatic door according to claim 1 wherein the door is an industrial door or a pedestrian door.

12. A method for controlling an automatic door comprising a door controller unit for controlling the door and acting on a door drive, and a monitoring system comprising at least two door sensors mounted on opposite sides of the door in a passage direction;

a. where each of said sensors monitors a sensor safety area;

b. where a safety signal is applied to the door controller unit upon detection of an object within the sensor safety areas of said sensors, and after a lapse of a predefined timespan of no object detection within said sensor safety areas of said sensors, the monitoring system is set to a “restricted mode” in which at least one sensor safety area is set to a restricted area;

c. where the safety signal is then provided upon detection of an object within the restricted area; and, d. where further, once a detection in the restricted area occurs, the monitoring system is set back to an unrestricted “normal” mode.

13. The method according to claim 12 wherein each sensor safety area comprises one inner region and one outer region, wherein the inner region is closer to the door than the outer region, and wherein during restricted mode only, the inner region is reduced to a restricted area.

14. The method according to claim 12 wherein each sensor comprises a detection unit that analyses the data gathered by the sensors, and wherein the detection unit ignores the data sensed outside the restricted area of the sensor safety area for generating a detection signal during the restricted mode.

15. The method according to claim 12 wherein the two sensors comprise a first sensor and a second sensor, the two sensors communicating a detection status of the sensor safety area and the restricted area to the other sensor, where each sensor is set to a restricted mode taking into account the information of the other sensor, and wherein only the second sensor forwards the safety signal to the door controller unit.

* * * * *